United States Patent [19]
Sharbaugh

[11] Patent Number: 4,762,667
[45] Date of Patent: Aug. 9, 1988

[54] PASSIVE REACTOR AUXILIARY COOLING SYSTEM

[75] Inventor: John E. Sharbaugh, Bullskin, Pa.

[73] Assignee: Westinghouse Electric Corp., Pittsburgh, Pa.

[21] Appl. No.: 451,530

[22] Filed: Dec. 20, 1982

[51] Int. Cl.4 .............................................. G21C 15/18
[52] U.S. Cl. .................................... 376/298; 376/403
[58] Field of Search ............... 376/290, 298, 299, 403, 376/404, 405

[56] References Cited

U.S. PATENT DOCUMENTS

| | | | |
|---|---|---|---|
| 3,366,547 | 1/1968 | Gumuchian et al. | 376/298 |
| 4,115,192 | 9/1978 | Jogand | 376/298 |
| 4,138,318 | 2/1979 | Speelman | 376/299 |
| 4,367,194 | 1/1983 | Schenewerk et al. | 376/298 |

Primary Examiner—Deborah L. Kyle
Assistant Examiner—Richard L. Klein
Attorney, Agent, or Firm—W. D. Palmer

[57] ABSTRACT

An entirely passive auxiliary core cooling system for a liquid-metal reactor wherein a path for natural circulation through a radial plenum and radially outermost core assemblies to the heat generating inner core assemblies is provided, the flow being cooled by a totally passive heat exchanger.

2 Claims, 1 Drawing Sheet

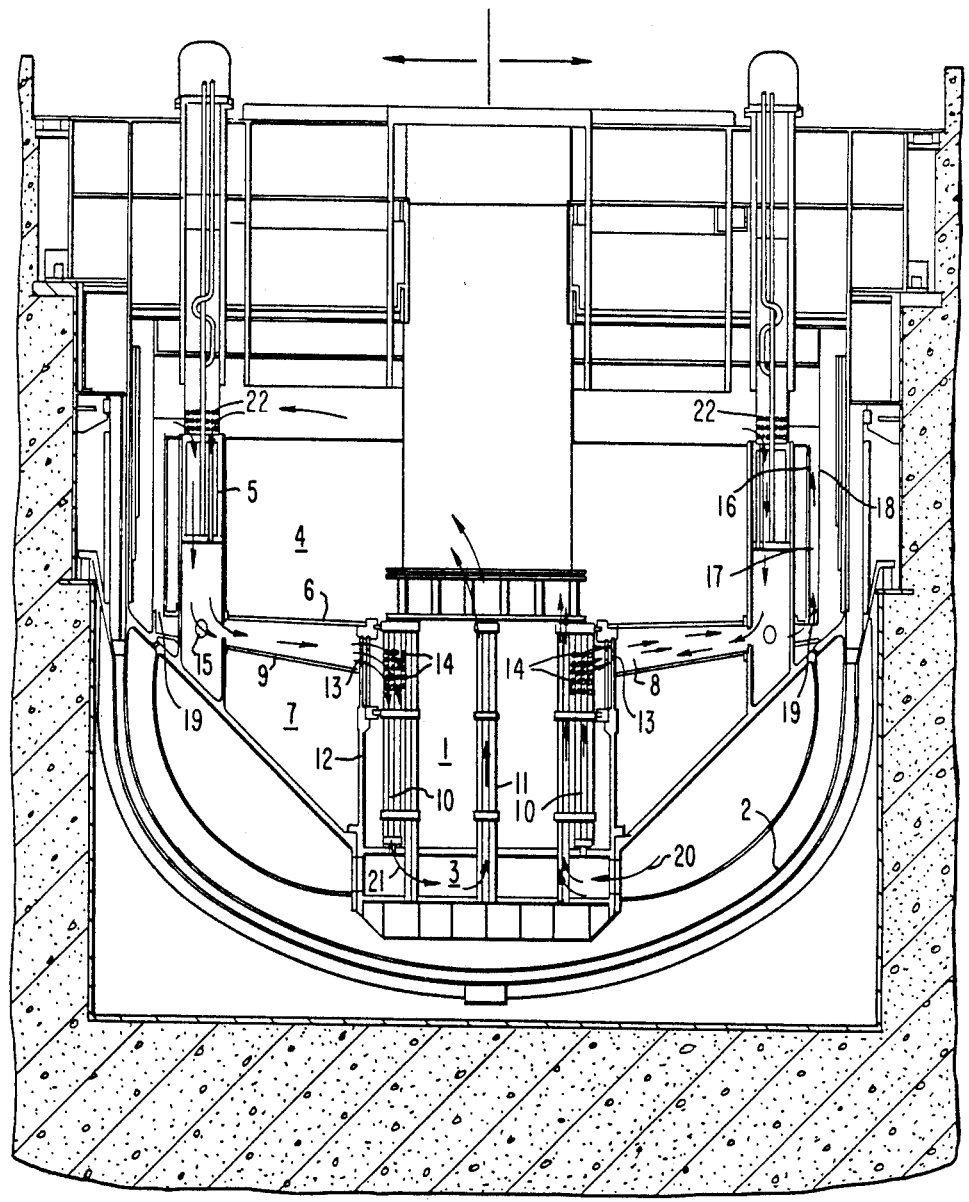

PASSIVE REACTOR AUXILIARY COOLING SYSTEM

BACKGROUND OF THE INVENTION

This invention relates to nuclear reactors, especially to auxiliary core cooling systems for loop and pool-type, liquid-metal, fast-breeder reactors (LMFBR).

The function of a direct reactor auxiliary cooling system (DRACS) for a nuclear reactor is to provide for coolant flow over the nuclear fuel assemblies of the core during routine shutdown conditions or emergencies in which the primary sources of coolant flow are inoperable. The system should have few or no moving components since reliability is enhanced by purely passive operation.

Consequently, this invention seeks to provide an entirely passive auxiliary cooling system.

SUMMARY OF THE INVENTION

A radial flow plenum is incorporated below the hot outlet plenum of a liquid metal nuclear reactor, providing a path for auxiliary coolant flow. Additionally, modifications to core assemblies opposite the radial flow plenum are effected to direct coolant flow to the radial flow plenum.

BRIEF DESCRIPTION OF THE DRAWINGS

FIG. 1 is a profile of a reactor having the invented auxiliary cooling system.

DESCRIPTION OF THE PREFERRED EMBODIMENT

Refer to FIG. 1 which is a profile schematic of a sodium-cooled, fast-breeder reactor of the pool type having a nuclear core 1 contained within a pressure vessel 2. The primary flow of sodium is from primary inlet plenum 3 upward through core 1 to hot outlet plenum 4. Hot sodium is pumped through a heat exchanger (not shown) in which heat is transferred to a secondary medium. Cooled sodium returns to inlet plenum 3.

A prior art boundary between inlet plenum 3 and outlet plenum 4 is plenum divider plate 6. Note that an intermediate plenum 7 may also exist between inlet plenum 3 and outlet plenum 4.

By this invention, a radial flow plenum 8 is formed by addition of radial flow baffle 9.

Nuclear core 1 may be considered to have an outer region of essentially non-heat producing assemblies termed radial shield assemblies 10 due to a core design function for this region which differs from central fuel assemblies 11 which generate heat and must be cooled. In FIG. 1, many fuel assemblies 11 have been omitted for clarity. Each fuel assembly 11 and shield assembly 10 has a duct surrounding the assembly which channels the flow to sodium therethrough.

Nuclear core 1 is contained within a cylindrical vessel called a core barrel 12.

By this invention, flow openings 13 are provided in the upper region of core barrel 12 communicating between the upper core region and radial flow plenum 8. The ducts of the radial shield assemblies 10 are modified to shut off flow of sodium through the top of the duct to hot outlet plenum 4 and to provide openings 14.

The outlets 15 of DRACS heat exchangers 5 (one shown) are within radial flow plenum 8.

A cylindrical flow baffle 16 is added which forms a vertical-flow plenum 17 with a sodium shield 18. Holes 19 in plenum divider plate 6 allow flow between plenum 17 and radial flow plenum 8.

Arrows 20, on the right hand side of FIG. 1, illustrate sodium flow for normal reactor operation. Arrows 21 on the left hand side of FIG. 1, illustrate sodium flow impelled by natural circulation, during reactor shutdown.

During normal reactor operation, the four primary pumps (not shown) deliver cold sodium to the core inlet plenum 3 at about 100 psi pressure. This flow is distributed to the fuel, blanket, control and shield assemblies by orifices in accordance with their heat generation capabilities. The coolant flow through the fuel, blanket and control assemblies is vertically upward and out into the hot outlet plenum 4 where it mixes and enters the intermediate heat exchangers (not shown). The flow through shield assemblies 10 is vertically upward and radically through the apertures 14 and then radially outward through the apertures 13 to radial flow plenum 8, where it mixes with down flow from the DRACS heat exchangers (5) coming from oulet plenum 4, and then enters and flows through vertical-flow plenum 17 to eventually mix with the core flow in outlet plenum 4. In this arrangement, the pressure differential across DRACS heat exchanger 5 is of the order of 1 to 2 psi. There is some limited flow of the DRACS secondary fluid just to maintain the system operational. This flow causes some cooling of the primary sodium within DRACS heat exchangers 5 and this cooled sodium being more dense, flows downward into radial flow plenum 8 as described above. This flow is from the hot plenum 4, through apertures 22 in the heat exchangers 5, and downwardly therethrough into radial-flow plenum 8.

If all power is lost to the reactor, a scram will occur and the primary pumps will stop. The core 1 region will continue to generate heat and, due to buoyancy, the heated sodium will flow upward into the hot outlet plenum 4. This sodium must be replaced for continuity and since buoyancy forces are acting, the cold sodium in the radial flow plenum 8 and the radial shield assemblies 10 will reverse direction and flow downward into core inlet plenum 3 and then up through the fuel assemblies 11. By this time the DRACS system will be cooling the outlet plenum 4 sodium at a faster rate than during normal reactor operations, and discharging the cooled sodium into radial flow plenum 8 where it will replace the sodium in radial shield assemblies 10 to complete the internal, natural and circulation flow path.

The significance of this invention is further enhanced by the fact that it also solves an inherent problem of LMFBR's. It has recently been recognized that the colder flow at the perimeter of the core, resulting from the lack of significant heat generation in the shield region and interstitial flow regions, can cause thermal striping of the upper internals structure, top load pad and the top of the core barrel when it discharges into the hotter outlet plenum. The addition of the radial flow plenum provides a method of keeping the colder shield discharge flow separated from the hot fuel assembly flows. Furthermore, the hottest flow streams are cooled by mixing and the shield flow is heated by conduction from the divider plate 6 before these flow streams are actually reunited for final mixing in hot plenum 4.

It can be seen that, with this configuration, no mechanical devices are used; and emergency coolant flow circulation is developed by passive, inherent buoyancy effects, as shown on the left side of FIG. 1.

I claim:

1. A liquid-metal fast-breeder nuclear reactor which includes a direct reactor core auxiliary cooling system, said reactor comprising:

a reactor core disposed within a cylindrical vertically disposed core barrel, a hot-liquid-metal plenum disposed generally above said core barrel, a cylindrical liquid-metal shield forming the lateral peripheral boundary for said hot-liquid-metal plenum, a plenum divider plate extending laterally from the upper exterior portion of said core barrel to said liquid-metal shield and forming the bottom boundary for said hot-liquid-metal plenum, a baffle member affixed to the exterior of said core barrel and laterally extending therefrom to said liquid-metal shield, a radial-flow plenum formed by said plenum divider plate and said baffle member, and a cooled-liquid-metal plenum positioned beneath and about said core barrel and opening into the bottom of said core barrel;

said reactor core comprising a centrally disposed fuel-assembly region comprising individual fuel assemblies and a surrounding radial-shield-assembly region comprising individual shield assemblies which have apertures provided in the upper lateral walls thereof to permit the flow of liquid metal therethrough, and the upper portion of said core barrel having lateral apertures provided therethrough to permit the flow of liquid metal between said core barrel and said radial-flow plenum;

vertically oriented heat exchanger members disposed within said hot-liquid-metal plenum and opening into said radial-flow plenum to permit liquid metal flow therebetween, apertures provided in an upper portion of said heat-exchanger members to permit liquid metal flow between said heat-exchanger members and said hot-liquid-metal plenum, a vertically oriented cylindrical flow baffle spaced inwardly from said liquid-metal shield to form therebetween a vertical-flow plenum, and said vertical-flow plenum having apertures opening into said radial-flow plenum to permit liquid metal flow therebetween;

during normal reactor operation, a substantial pressure drop exists between said cooled-liquid-metal plenum and said hot-liquid-metal plenum to cause liquid metal to flow upwardly through said fuel assemblies to be heated thereby, liquid metal also flows upwardly through said radial-shield assemblies and into said radial-flow plenum and then upwardly through said vertical-flow plenum and then into said hot-liquid-metal plenum; and during reactor scram conditions, liquid metal flows from said hot-liquid-metal plenum into said heat-exchange members and downwardly therethrough to be cooled and then to flow into said radial-flow plenum, thereafter the cooled liquid metal flows into said radial-shield assemblies and downwardly therethrough and into said cooled-liquid-metal plenum and then upwardly through said fuel assemblies to remove heat therefrom.

2. The reactor as specified in claim 1, wherein during normal reactor operation a small quantity of liquid metal also flows from said hot-liquid-metal plenum through said heat exchanger members and into said radial flow plenum and then upwardly through said vertical flow plenum.

* * * * *